United States Patent [19]

van der Velde

[11] 3,986,738
[45] Oct. 19, 1976

[54] METHOD FOR COUPLING TWO TUBES, PREFERABLY PLASTIC TUBES, WITH EACH OTHER

[76] Inventor: Herbertus van der Velde, Essenpark 8, Leiderdorp, Netherlands

[22] Filed: Dec. 17, 1974

[21] Appl. No.: 533,511

[30] Foreign Application Priority Data
Dec. 17, 1973 Netherlands .................. 7317234

[52] U.S. Cl. .................... 285/403; 264/101; 264/152; 264/255; 264/263; 264/264; 264/271
[51] Int. Cl.² ............................... B29D 3/00
[58] Field of Search ......... 264/152, 159, 261, 250, 264/248, 101, 90, 255, 263, 264, 271; 285/284, 288, 292, 403

[56] References Cited
UNITED STATES PATENTS

| 1,180,625 | 4/1916 | Vaughn | 285/292 |
| 2,378,901 | 6/1945 | Amrhein et al. | 264/261 |
| 2,695,853 | 11/1954 | Foreit | 264/248 |
| 2,889,582 | 6/1959 | Cooper | 264/248 |
| 3,423,816 | 1/1969 | Grosh et al. | 264/152 |
| 3,458,619 | 7/1969 | Prochaska | 264/261 |
| 3,776,993 | 12/1973 | Lachenmayer | 264/248 |

Primary Examiner—Robert F. White
Assistant Examiner—T. E. Balhoff
Attorney, Agent, or Firm—Owen, Wickersham & Erickson

[57] ABSTRACT

A method for coupling tubes. One tube has a female coupler member at one end and the other tube has a male coupler member that is inserted into the female coupler member so that the outer surfaces join along a regular path. Then wire is wrapped around the joined couplers.

8 Claims, 3 Drawing Figures

METHOD FOR COUPLING TWO TUBES, PREFERABLY PLASTIC TUBES, WITH EACH OTHER

BACKGROUND OF THE INVENTION

The present invention relates to a method for coupling two tubes, preferably two plastic tubes, with each other.

Tubes, which have to be coupled to each other, e.g. metal tubes, have often been welded to each other, or the tubes have been provided with flanges for fixing the tubes to each other by means of bolts inserted in holes in the flanges. The use of steel tubes is expensive, whilst welding the tubes to each other takes relatively long time. Providing flanges on plastic tubes, which can be used under high pressures, presents a number of difficulties, such as obtaining a flange connection which can withstand the high forces which can appear, e.g. when using the tubes for connection to sub-marine well heads or the like, obtaining a suitable such flange connection is very difficult when not impossible.

An object of the invention is to provide a method which in a simple and quick way enables a coupling between tubes, especially plastic tubes, whereby such a coupling can withstand high forces.

SUMMARY OF THE INVENTION

According to the invention such a coupling can be obtained by providing one end of a first tube with a first member, which fits in a second member provided on an end of another tube in such a way that the outer surfaces of both members join each other along a regular path when one member has been inserted in the other member, then after inserting one member in the other member the members are wrapped on the outside with wire.

In this way a very strong connection can be obtained between the tubes which have to be coupled with each other, whereby the connection can accommodate high forces without any risk.

A very favourable method for making the connection is obtained by (1) providing on the outer side of one tube, near one end, a body which extends around said tube and of which the outer circumference near the ends of the body is smaller than the part of the body situated between those ends, (2) around the end of the tube provided with the body and around one end of the tube to be coupled thereto is then mounted a one-piece coupling jacket of one piece, which thereafter near the point of the largest cross-section of the body, the jacket is divided into two parts. In this way a favourable manufacturing of the members on the tube ends, which has to be inserted into each other, can be obtained.

BRIEF DESCRIPTION OF THE DRAWINGS

The invention will be explained with the aid of the accompanying drawing, wherein different steps of the production of a coupling construction according to the invention have been shown schematically.

DESCRIPTION OF A PREFERRED EMBODIMENT

Figure 1:
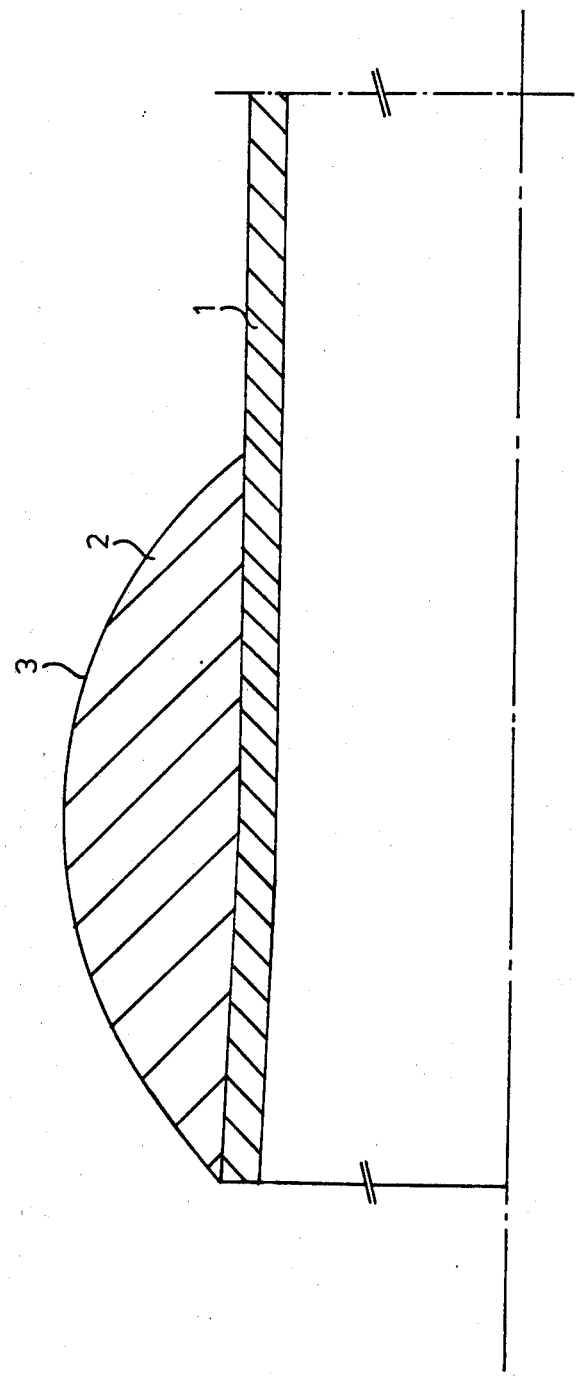
FIG. 1 shows schematically a part of an end of a tube with a body arranged around said end.

In FIG. 1 is shown a part of one end of a first tube 1 made from plastic, said tube being adapted for use under high-pressure conditions. Both ends of both tubes 1 and 4 are preferably somewhat tapered, whereby the largest diameters of the tubes 1 and 4 situated at the ends of the tubes. The invention calls for providing on the tube 1 a body 2 of which the outer surface 3 preferably forms part of a spherical surface. In order to do this, the tapered end 11 of the tube 1 is arranged in a mold the inner surface of which corresponds with the desired surface 3 and the shape of the body 2. Thereafter the space between the tube and the mold is filled with filling means, e.g. sand, and then a vacuum is generated in the mold and a synthetic resin injected into the filling means. So after removing the part from the mold and after the setting of the resin there is secured on the tapered end of the tube 1 a very hard body 2 with good shock resistance.

Figure 2:
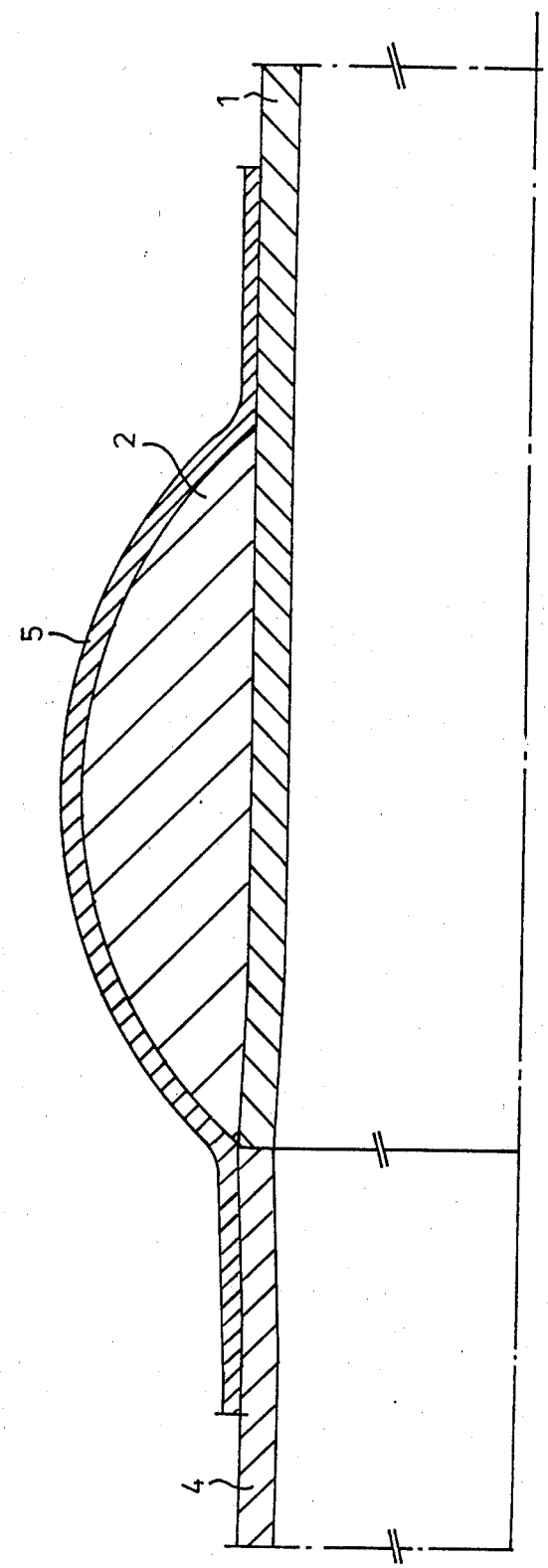
FIG. 2 shows schematically parts of two tubes from which the ends lie against each other and a coupling jacket surrounding the ends of the tubes and a body mounted on the end of one tube.

Next, as shown in FIG. 2, the tapered end of a tube 4 is placed against the end of the tube 1 having the body 2 mounted thereon, and then around those ends of the tubes 1 and 4 and the outer surface 3 of the body 2 is mounted a coupling jacket 5.

Preferably the coupling jacket 5 is made from wire e.g. high resistance steel wire with a diameter of 0.22 mm, the wire being coated with epoxy resin and wrapped around the ends of the tubes 1 and 4 and the body 2 by means of a winding device. The coupling jacket 5 may also contain, as between successive layers of wire, mats of fiber glass impregnated with resin. Said manufacturing can be done in a way similar as described in the older Dutch patent application No. 7,301,826, U.S. application Ser. No. 441,428, filed Feb. 11, 1974.

However before mounting the coupling jacket 5 the part of the outer surface 3 of the body situated at the left hand side of the biggest section of the body 2, when seen in FIG. 2, is rubbed with release means, such that said part of the coupling jacket 5, which becomes situated opposite said part of the body 2 will not adhere to said body 2.

After the manufacturing of the coupling jacket said jacket is cut in two at the place of the largest cross-sectional diameter of the body 2, or, as seen in FIG. 2, just to the left thereof, so that the tubes 1 and 4 can be disconnected from each other. Thereby, the tube 1 has been provided at one end with a male coupler member formed by the body 2 and the right hand part 5a (FIG. 3) of the coupling jacket 5, whereby this male coupled member can be inserted into a female coupled member provided on the tube 4 and formed by the left hand part 5b (FIG. 3) of the coupling jacket 5.

It will be clear, that all the tubes 1 and 4 which have to be coupled with each other can be provided at one end with a male coupler member formed by the parts 2 and 5a and at the other end with a female coupler member formed by the part 5b. It will be clear, that the various tubes are exchangeable, as during the manufacturing all the bodies 2 are made in the same mold, and the coupling jacket 5 is formed on the outer surface 3 of the body 2.

The tubes 1 and 4 can be transported separately from each other to the place, where the tubes 1 and 4 have to be coupled with each other for use. In order to couple two tubes 1 and 4 with each other the male coupler member comprising the body 2 and the part 5a of the coupling jacket provided on the end of the tube 1 is inserted into the female coupler member formed by the part 5b of the coupling jacket provided on the tube 4, whereby the space, which is formed by cutting the coupling jacket 5 is filled with a suitable gasket 6.

Figure 3:
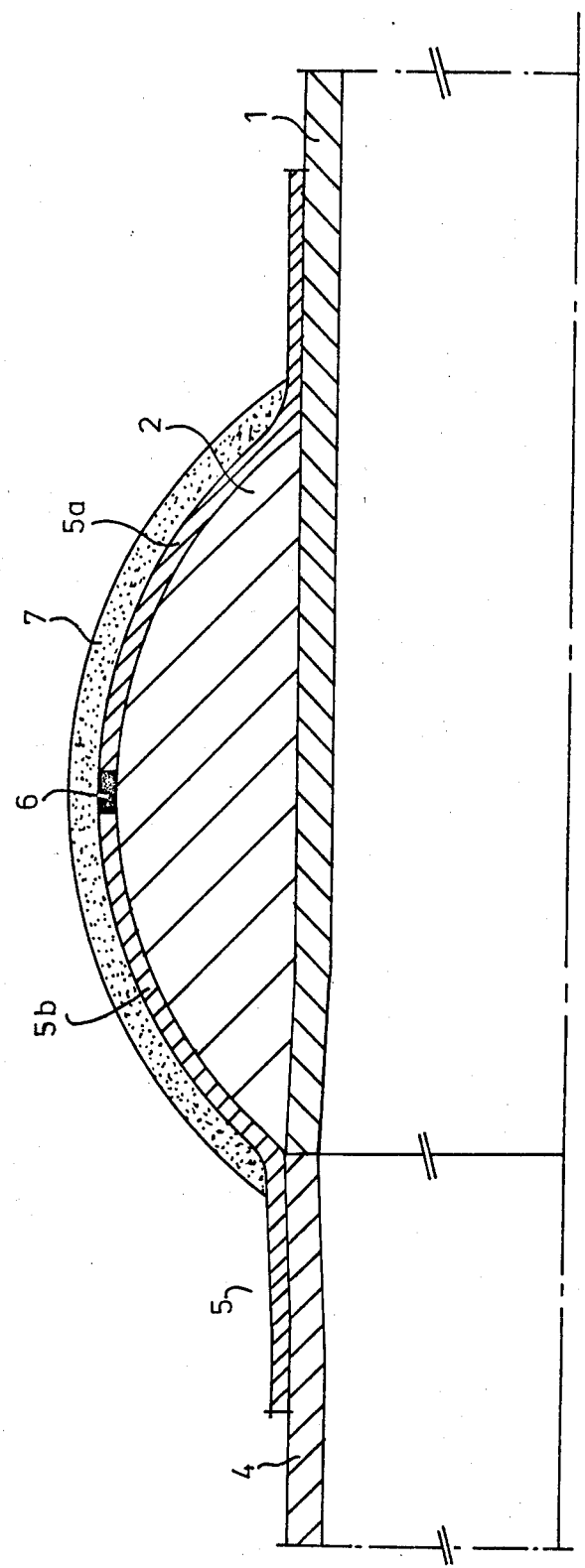
FIG. 3 shows schematically a section over parts of the ends of the tubes after making the connection between said ends of the tubes.

Thereafter more wire 7, which may also be high resistance steel wire coated with epoxy resin, is wrapped around the outer surface of the coupling jacket portions 5a and 5b and the gasket 6 in a number of layers by means of a winding device, to give the structure shown in FIG. 3. During this wrapping the ends of the tubes 1 and 4 maybe held against each other by means of suitable auxiliary supporting means. For wrapping the wire 7 on the coupling jacket 5 there can be used a light weight transportable winding machine, which can rotate around the tubes, which have to be coupled with each other. Such a winding device can be made e.g. in a way similar to the winding device described in the above cited application Ser. No. 441,428, so that in performing the method according to the present invention it is not necessary for the stroke of the winding arm to be freely adjustable, so that the winding device can be simple.

In the above described way there can be obtained a solid connection between two tubes especially suitable for tubes made from plastic and suitable for use at high pressures. Such tubes, which have been connected in the above described way can be used e.g. succesfully in offshore oil fields, e.g. for making pipelines, which have to be connected with well heads or the like, whereby the tubes can be transported separated from each other to a drilling platform or the like and can be coupled with each other on said drilling platform by means of the winding device.

I claim:
1. A method for coupling two tubes of substantially identical diameter, including tubes made from plastic, comprising the steps of first, forming on the outer side near one end of a first said tube a partially spherical body extending around said tube such that both ends of said body in contact with said first tube are smaller than at a point between the ends of said body, then placing one end of a second said tube against said one end of said first tube, next forming a one-piece coupling jacket around the ends of said first and second tubes, then cutting said coupling jacket in two at or substantially at the place of the largest cross-sectional thickness of said body, thereby to provide a male coupler member on said first tube and a female coupler member on said second tube, so that said tubes can be uncoupled, if desired, at this stage, and then when said tubes are in the position resulting from said cutting step, wrapping wire around said male and female coupler members to hold them in place.

2. Method according to claim 1, characterized in making the coupling jacket by providing around the body and parts of the tubes situated on both sides of said body a layer of epoxy resin reinforced by steel wire.

3. Method according to claim 2, characterized in applying a release agent to that part of the outer surface of said body which is to lie beyond that part of the coupling jacket which remains connected with said body prior to making said coupling jacket.

4. Method according to claim 3, characterized in, prior to wrapping said coupler members with wire, mounting a gasket between both the two parts of the coupling jacket.

5. Method according to claim 4, characterized in, that the body is mounted on the end of said tube by inserting said tube in a mold the shape of which corresponds to the shape of the desired body and then filling the mold with filling means.

6. Method according to claim 5, characterized in wrapping said male and female coupler members with a high strength steel wire a diameter of about 0.22 mm.

7. Method of claim 5 wherein said filling means comprises sand and an artificial resin and they are injected in during generating of a vacuum in said mold.

8. A coupling comprising the product manufactured by using the method according to claim 1.

* * * * *